Feb. 6, 1923.
J. DYER.
BOLSTER.
FILED MAR. 31, 1921.
1,444,671.
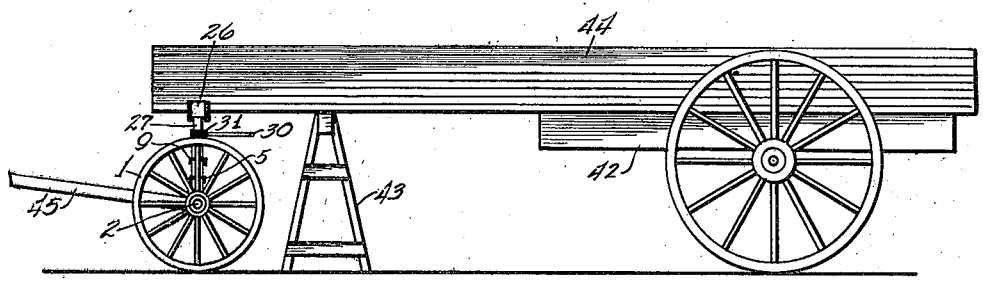
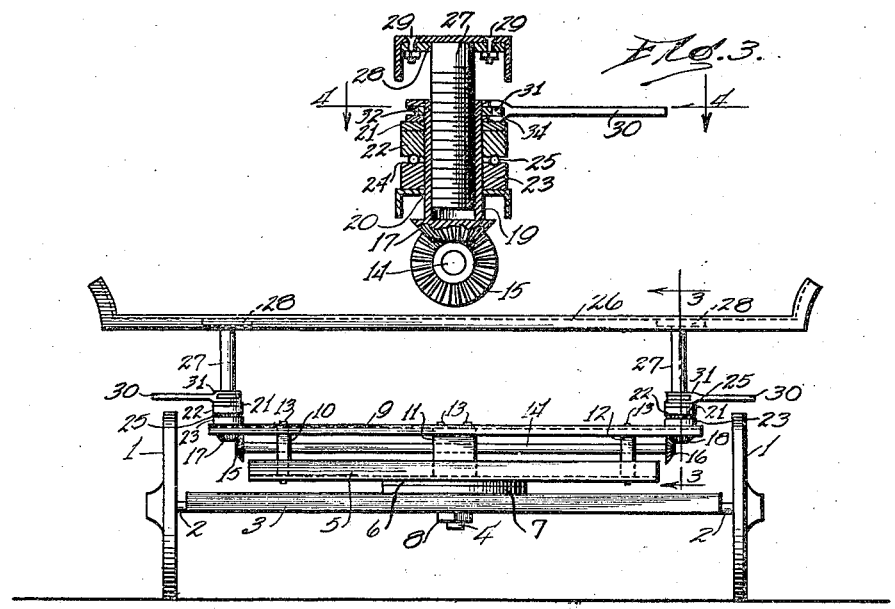
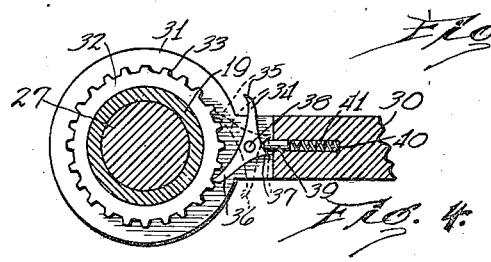
INVENTOR
J. Dyer
BY
Munn & Co.
ATTORNEYS Patented Feb. 6, 1923.

1,444,671

UNITED STATES PATENT OFFICE.

JOHN DYER, OF CHICAGO, ILLINOIS, ASSIGNOR OF ONE-HALF TO NORMAN C. MATHER, OF CHICAGO, ILLINOIS.

BOLSTER.

Application filed March 31, 1921. Serial No. 457,384.

*To all whom it may concern:*

Be it known that I, JOHN DYER, a citizen of the United States, and a resident of Chicago, in the county of Cook and State of Illinois, have invented a new and useful Improvement in Bolsters, of which the following is a full, clear, and exact description.

My invention relates generally to vehicles and more particularly to bolsters in vehicles designed for use in transporting articles as desired.

An object of my invention is to provide a device adapted to be used in transporting a load such as lumber or the like from place to place with the necessity of handling the pieces composing the load at each operation obviated.

A further object of my invention is to provide a device of the type described that can be instantly adjusted to successively support selected loads, whereby the maximum number of loads may be transported in a given time.

A further object of my invention is to provide in a device of the type described of novel form of bolster.

A further object of my invention is to provide a device of the character described that is relatively simple in construction and operation, thoroughly effective for the purpose intended and practical commercially.

Other objects and advantages will appear in the following specification, and the novel features of the invention will be particularly pointed out in the appended claims.

My invention is illustrated in the accompanying drawings, forming part of this application, in which Fig. 1 is a side elevation showing the use and application of the device, Fig. 2 is a rear view of the device, Fig. 3 is an enlarged section along the line 3—3 of Fig. 2, Fig. 4 is a section along the line 4—4 of Fig. 3.

In carrying out my invention, I make use of a pair of wheels 1—1 supported at the ends of an axle 2. A beam 3 is secured on the axle. The parts described so far are ordinary in construction and form no part of my invention, except in so far as they cooperate with the parts which will now be described. A king bolt 4 projects through an opening in a channel 5 intermediate the length of the latter and through a registering opening in the beam 3. The channel 5 is spaced from the beam by bolster plates 6 and 7 on the king bolt, and a nut 8 screwed on the king bolt at its lower end maintains the parts in adjusted relative positions. The beam 3 and consequently the axle 2 may pivot on the king bolt 4.

The channel 5 forms the lower supporting member of the bolster that embodies a frame consisting of the channel 5, a second channel 9 parallel therewith and spaced therefrom by vertical struts 10, 11 and 12. The struts are secured to the channel 5 and the channel 9 by any suitable means as by screws or bolts 13 so that a substantially rigid frame is produced.

A countershaft 14 is journalled in the struts 10, 11 and 12 approximately midway between the channels 5 and 9 and parallel therewith. The countershaft has bevel gears 15 and 16 at its ends in mesh with bevel gears 17 and 18, respectively, that are integral with similar sleeves 19—19 (see Fig. 3). The sleeves 19—19 are vertical and parallel with one another, each being projected through an opening 20 through the channel 9 adjacent an end of the latter. Each sleeve 19 is supported by means of a collar 21 shrunk thereon resting upon an upper ball race member 22 that is superposed on a lower ball race member 23 supported on the channel 9. The ball race members 22 and 23 are formed to provide a race 24 in which work a plurality of ball members 25.

A work supporting member 26 formed of a channel having upstanding side members or guards is adjustably supported above the channel 9 by means of similar vertical screws 27—27. Each of the latter has its end disposed in the corresponding sleeve 19 which is threaded for the reception thereof and each is secured at its head or upper end to a plate 28. The latter is firmly secured to the work supporting member 26 by bolts 29 or other suitable means. The screws 27 are therefore held against rotation and obviously the work supporting member 26 will be supported at various heights and parallel with the channel 9 when either sleeve 19 is rotated as the screws 27 will then be moved in the direction of their lengths and relative to the sleeves.

In order to expeditiously rotate either sleeve 19 in either direction, I provide an operating handle 30 for each sleeve. Each operating handle is formed with a yoke 31 loosely mounted on the sleeve and embracing a ratchet 32 that is rigidly mounted on the sleeve and is provided with teeth 33. A double acting pawl 34 having fingers 35 and 36 and a body portion tapering to a point at 37 in a plane intermediate the ends of the fingers 35 and 36 is pivoted at 38 to each operating handle so that the fingers 35 and 36 may be selectively moved into engagement with the teeth 3. A plunger 39 working in a socket 40 and the operating handle is pressed outwardly by a spring 41 and engages the pawl at either side of the tapered end 37 so that either of the fingers 35 and 36 will be maintained in engagement with the ratchet teeth 33. Obviously when the finger 35 of the pawl engages the teeth of the ratchet, the operating handle 30 may be operated to rotate the sleeve in one direction, whereas when the finger 36 engages the ratchet teeth, the operating handle may be moved to rotate the sleeve in the opposite direction. It will thus be observed that the work supporting member 36 may be raised or lowered at will.

From the foregoing description of the various parts of the device, the operation thereof may be readily understood. The device is intended primarily for use in transporting lumber from place to place as for instance in a yard. It is well known that the use of ordinary vehicles and trucks for transporting lumber and the like involves loss in that the vehicles and trucks must remain stationary the greater part of the time while the loads are being placed thereon or removed therefrom. When my improved device is used, the vehicle embodying the same may be used continuously in the actual transportation of loads and consequently the maximum number of loads may be transferred from place to place in a given time. The load 44 that is to be moved is assembled and is supported at one end by any suitable vehicle, such as indicated at 42 and supported adjacent the end thereof in any suitable manner, as for instance, by a saw horse 43. It will be understood that a number of the loads 44 may be assembled and that the work of assembling loads to be transported will not be interrupted by the transportation of any load. As each load is to be moved, the vehicle embodying my invention is adjusted to the load by operating either one of the handles 30 until the load has been lifted at its forward end from the horse 43. The load will then rest upon the work supporting member 26 and since it is supported at its other end by movable means, it may be moved readily as desired. The weight of the load will maintain the same in position on the work supporting member 26 although ordinary fastening means, such as chains or hooks, (not shown) or the like may be used if required at any particular time. A tongue 45 or the like is attached to the beam 3 and provides a convenient means for handling the device.

The device is simple in construction and makes for economy in that a maximum amount of work may be accomplished in a given time.

I claim:

1. A device of the character described comprising a frame including a horizontally disposed work supporting member, a rotatable vertically disposed interiorly threaded sleeve carried by said frame member adjacent to each end thereof, a verical screw engaged at its lower end with said sleeves at their upper ends, and means for rotating the sleeves from either side of said frame to vary the height of the work supporting member, said means comprising handles pivotally mounted concentric said sleeves, each of said handles being provided with pawls, a ratchet gear carried concentric each of said sleeves, means for selectively engaging the opposite teeth of said pawls with said ratchet gear to turn said sleeves in one of two directions, and a cross shaft operatively connecting said sleeves one to the other.

2. A device of the character described comprising a frame including a horizontally disposed longitudinal work supporting member, said frame arranged for rotation in a horizontal plane upon a vehicle axle, a rotatably vertically disposed interiorly threaded sleeve carried by said frame member adjacent each end thereof, a vertical screw engaged at its lower end with said sleeves at their upper ends, and means for rotating the sleeves from either side of said frames to vary the height of the work supporting member, said means comprising handles pivotally mounted concentric said sleeves, each of said handles being provided with pawls, a ratchet gear carried concentric each of said sleeves, means for selectively engaging the opposite teeth of said pawls with said ratchet to turn said sleeves in one of two directions, and a cross shaft operatively connecting said sleeves to one another.

JOHN DYER.